United States Patent [19]

Buysch et al.

[11] Patent Number: 5,324,777
[45] Date of Patent: Jun. 28, 1994

[54] PROCESS FOR THE PRODUCTION OF POLYMERS CONTAINING AMMONIUM GROUPS

[75] Inventors: Hans-Josef Buysch, Krefeld; Dieter Arlt, Köln; Klaus Szablikowski, Walsrode, all of Fed. Rep. of Germany

[73] Assignee: Wolff Walsrode AG, Walsrode, Fed. Rep. of Germany

[21] Appl. No.: 16,336

[22] Filed: Feb. 11, 1993

[30] Foreign Application Priority Data

Feb. 21, 1992 [DE] Fed. Rep. of Germany ....... 4205281

[51] Int. Cl.$^5$ .................... C08G 63/48; C08G 63/91; C08F 8/00; C08B 15/06
[52] U.S. Cl. .................... 525/54.3; 525/54.31; 525/58; 525/123; 525/127; 525/453; 527/301; 527/401
[58] Field of Search ............ 525/54.3, 54.31, 58, 525/123, 127, 453; 527/301, 401; 528/44, 59, 85

[56] References Cited

U.S. PATENT DOCUMENTS

| | | | |
|---|---|---|---|
| 3,963,680 | 6/1976 | O'Keefe et al. | 528/82 |
| 4,898,922 | 2/1990 | Shiraki | 528/85 |
| 4,939,216 | 7/1990 | Lawrenz et al. | 525/454 |
| 4,980,385 | 12/1990 | Scarpati et al. | 528/85 |

FOREIGN PATENT DOCUMENTS

| | | |
|---|---|---|
| 0351612 | 1/1990 | European Pat. Off. . |
| 0367003 | 5/1990 | European Pat. Off. . |
| 4112315 | 10/1992 | Fed. Rep. of Germany . |

*Primary Examiner*—Nathan M. Nutter
*Attorney, Agent, or Firm*—Sprung Horn Kramer & Woods

[57] ABSTRACT

The invention relates to a process for the production of polymers containing ammonium groups in which OH-functional polymers are first reacted with isocyanates corresponding to general formula I $$OCN-R-CH_2-X \qquad I$$

in which R represents $C_{2-11}$ alkylene or arylene and X represents halogen, to form urethanes and the urethanes are subsequently reacted with tertiary aliphatic amines corresponding to formula II $$R^1-\underset{\underset{R^3}{|}}{N}-R^2 \qquad II$$

in which $R^1$ to $R^3$ may be the same or different.

3 Claims, No Drawings

PROCESS FOR THE PRODUCTION OF POLYMERS CONTAINING AMMONIUM GROUPS

This invention relates to a process for the production of polymers containing ammonium groups by reaction of OH-functional polymers with isocyanates corresponding to general formula I $$OCN-R-CH_2-X \qquad I$$

in which R represents $C_{1-11}$ alkylene or arylene and X is halogen, to form urethanes and subsequent reaction of the urethanes with tertiary aliphatic amines corresponding to formula II $$R^1-N-R^2 \qquad II$$
$$\quad |$$
$$\quad R^3$$

in which $R^1$ to $R^3$ may be the same or different and represent $C_{1-8}$ alkyl, hydroxyalkyl, cyanoalkyl, alkenyl, aralkyl or alkylene and form a ring with the N atom, to form quaternary urethane ammonium compounds.

It is known that OH-functional polymers can be converted into polymers containing ammonium groups. The problems involved in the production of such products have not yet been satisfactorily solved. Several processes have been proposed and generally lead to low degrees of substitution. Although, for example, highly substituted polysaccharides can be obtained in accordance with EP-A 367 003 (see also the literature cited therein), the process described therein involves three polymer-analog reactions to be successively completed which is time-consuming and involves corresponding material and working-up costs.

It has now been found that OH-functional polymers can readily be reacted first with isocyanates corresponding to formula I to form urethanes and the urethanes thus formed can be subsequently reacted with tertiary aliphatic amines corresponding to formula II to form polymers bearing ammonium groups, the reactions taking place unambiguously with a high reagent yield and without any need for large quantities of auxiliary reagents.

Suitable OH-functional polymers are, for example, polyvinyl alcohols, polyacrylates produced using OH-functional monomers, such as β-hydroxyethyl (meth)acrylate, but especially polysaccharides, starch, dextrins, glycogen, polyglycosans, such as cellulose and derivatives thereof, for example methyl cellulose, hydroxyethyl cellulose, hydroxypropyl cellulose, mixed cellulose ethers, such as methyl hydroxyethyl celluloses, methyl hydroxypropyl cellulose, hydroxyethyl hydroxypropyl cellulose, sulfoethyl cellulose, sulfoethyl carboxymethyl cellulose, methyl sulfoethyl cellulose, hydroxyethyl sulfoethyl cellulose, dihydroxypropyl cellulose, dihydroxypropyl hydroxyethyl cellulose, dihydroxypropyl carboxymethyl cellulose, carboxymethyl cellulose, esters and salts thereof, such as sodium, potassium, calcium and ammonium ions, carboxymethyl hydroxyethyl cellulose, cellulose sulfate, polyfructosans, such as inulin and graninin, polymannosans, and also mixed polysaccharides, such as hemicelluloses; polyxylosans, polyarabiosans and also heteropolysaccharides, such as gellan, xanthan and pullulan.

Cellulose and derivatives thereof, starch and dextrins are preferred, cellulose, methyl cellulose, hydroxyethyl cellulose, hydroxypropyl cellulose and starch being particularly preferred.

Suitable isocyanates are those corresponding to formula I $$OCN-R-CH_2-X \qquad I$$

in which R represents $C_{1-11}$ alkylene and arylene, preferably $C_{1-8}$ alkylene, and X is halogen, preferably chlorine, for example 2-chloroethyl isocyanate,, 3-chloropropyl isocyanate, 4-chlorobutyl isocyanate, 5-chloropentyl isocyahate, 6-chlorohexyl isocyanate*, 7-chloroheptyl isocyanate, 8-chlorooctyl isocyanate, o-, m-, p-chloromethylphenyl isocyanate, p-chloro-o-methylphenyl isocyanate or the corresponding bromine compounds (*=preferred).

These compounds are obtained by phosgenation of the corresponding haloalkyl amine hydrohalides or the corresponding aminoalcohols, i.e. for example 2-chloroethyl isocyanate from 2-chloroethyl amine hydrochloride or from ethanolamine by phosgenation (cf. Anm. 562, 75 et seq., 1949). The reagent yield in the reaction with the isocyanates is very high because the reaction takes place unambiguously and excesses can be reused after washing out either directly or optionally after purification by distillation.

The reaction of the isocyanates corresponding to formula I with the OH-functional polymers takes in solution or dispersion, the polysaccharides preferably being used in suspension because they form highly viscous solutions which only allow low solids contents and, hence, require a large reaction volume and complicated working up.

Suitable solvents and dispersants are inert under the reaction conditions. Examples are hydrocarbons, such as cyclohexane, pentane, heptane, isooctane, benzene, toluene; halogenated hydrocarbons, such as methylene chloride, chloroform, dichloroethane, trichloroethylene; ethers, such as diethyl ether, diisopropyl ether, dibutyl ether, dioxane, anisole, dimethoxyethane; esters, such as ethyl and butyl acetate, ethyl propionate, ethyl benzoate; ketones, such as acetone, methyl ethyl ketone, diethyl ketone, methyl isopropyl ketone, cyclohexanone, acetophenone; amides, such as dimethyl formamide, dimethyl acetamide, tetramethyl urea, N,N-dimethyl ethylene urea, N-methyl pyrrolidone, N-methyl caprolactam; nitriles, such as acetonitrile, propionitrile, benzonitrile, β-methoxypropionitrile and β-cyano-β'-methoxydiethyl ether.

The reaction temperature is in the range from 0° to 120° C., preferably in the range from 10° to 110° C. and, more preferably, in the range from 15° to 100° C.

The starting products and solvents or dispersants should be substantially free from water so that the isocyanates are not involved in any secondary reactions with water.

The OH-functional polymer is generally introduced in the corresponding medium and the isocyanate is added as such or even in solution in a solvent. One and the same medium may be used both for the polymer-analog reaction and for the isocyanate. The reaction time is between 30 minutes and several hours.

The addition of the isocyanate onto the OH-functional polymers generally takes place slowly so that it is best catalyzed. The catalysts typically used for the formation of urethanes from isocyanates and alcohols are used in the proposed quantities as catalysts (see Houben-Weyl, Vol. E 20, 1604 et seq., 1987). Particularly preferred catalysts are organotin compounds, such as dibutyl tin dilaurate or tin dilaurate.

The molar ratios of one polymer unit containing 1 OH function to isocyanate are generally 1:0.1 to 1:100, preferably 1:0.5 to 1:80 and, more preferably, 1:0.8 to 1:50.

After the reaction of the OH-functional polymer with the isocyanate corresponding to formula I, the urethanecontaining polymer may be isolated and purified or may even be directly reacted with amines. The reaction product is isolated from the suspension by filtration or centrifugation. It is purified by washing with the solvent used or with other solvents, including alcohols in case an excess of the isocyanate can no longer be used.

The reaction of the urethane-functional polymer with tertiary amine II takes place in the same solvent or dispersion medium, in the same molar ratios, at the same temperatures and in the same times as the reaction of the OH-functional polymer with the isocyanate. Working up and purification are also carried out in the same way.

Suitable tertiary amines are those corresponding to formula II,

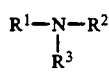    II in which $R^3$ to $R^3$ may be the same or different and represent $C_{1-8}$ alkyl, preferably $C_{1-3}$ alkyl; $C_{5-6}$ cycloalkyl, preferably cyclohexyl; $C_{2-6}$ hydroxyalkyl, preferably hydroxyethyl and hydroxypropyl; $C_{2-4}$ cyanoalkyl, preferably cyanoethyl; $C_{3-8}$ alkenyl, preferably allyl and methallyl; $C_{7-8}$ aralkyl, preferably benzyl; and $R^1$ and $R^2$ represent $C_{2-5}$ alkylene and form a ring with the N atom, preferably $C_4$ and $C_5$ alkylene with formation of the pyrrolidine and piperidine rings. Examples of such amines are trimethylamine*, triethylamine*, dimethyl benzylamine, dimethyl cyclohexylamine, N,N-dimethyl ethanolamine,, N-methyl diethanolamine, triethanolamine, tripropyl amine, tributyl amine, dimethyl butylamine, N,N-diethyl ethanolamine, N,N-dimethyl propanolamine*, N-methyl dipropanolamine, N-methyl piperidine, N-methyl pyrrolidone, N,N-dimethyl cyanoethyl amine (*=preferred).

Cationically functionalized polymers are widely used auxiliaries in the paper industry, are the starting point for the production of highly active filter materials used in the medical field and in the food industry and are also used as additives in hygienic and cosmetic cleaning and care preparations and as flocculants in the treatment of wastewaters.

EXAMPLE 1

200 g of a commercially available hydroxyethyl cellulose having a degree of substitution (DS) of 1.1 were suspended in 1 l methylene chloride and, after the addition of 100 g 6-chlorohexyl isocyanate and 1 g Desmorapid SO (a commercially available tin catalyst made by Bayer AG for reactions of isocyanates with alcohols) as catalyst, were heated for 24 h at 40° to 45° C. Working up by filtration under suction, washing with methylene chloride and isopropanol and drying in vacuo at 50° C. gave 235 g urethane cellulose having a strong band at 1720 cm$^{-1}$ in the IR spectrum and an N content of 2.0%.

EXAMPLE 2

Example 1 was repeated with 200 g 6-chlorohexyl isocyanate instead of 100 g. A urethane cellulose with a very strong band at 1720 cm$^{-1}$ in the IR spectrum and an N content of 3.1% was obtained in a yield of 295 g.

EXAMPLE 3

50 g of the urethane cellulose of Example 1, 80 g triethanolamine and 300 ml toluene were stirred for 10 h at 90° C., filtered under suction, washed repeatedly with isopropanol and dried in vacuo at 50° C. A cationic cellulose containing 2.7% N and 2.8% Cl was obtained in a yield of 53 g.

EXAMPLE 4

50 g of the urethane cellulose of Example 2, 50 g N,N-dimethyl ethanolamine and 400 ml toluene were stirred for 12 h at 80° C. Working up as in Example 3 gave 56 g of a cationic cellulose containing 4.8% N and 5.1% Cl.

We claim:

1. Process for the production of a polymer containing quaternary ammonium groups, which comprises reacting, at a temperature from about 0° to 120° C., a solution or dispersion of a polymer containing —OH groups with an isocyanate of the formula

in which
R is $C_{1-11}$-alkylene or arylene, and
X is halogen,
thereby to form a urethane, the molar ratio of OH to isocyanate ranging from about 1:0.1 to 1:100, and reacting the urethane with a tertiary amine of the formula

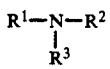

in which
$R^1$, $R^2$, and $R^3$ each independently is $C_{1-8}$-alkyl, $C_{5-6}$-cycloalkyl, $C_{2-6}$-hydroxyalkyl, $C_{2-4}$-cyanoalkyl, $C_{3-8}$-alkenyl or $C_{7-8}$-aralkyl, or
$R^1$ and $R^2$, together with the N atom, form a 3- to 6-membered ring.

2. A process according to claim 1, wherein the polymer comprises at least one material selected from the group consisting of polyvinyl alcohols, polyacrylates produced using OH-functional monomers, starch, dextrins, glycogen, polyglycosans, cellulose, methyl cellulose, hydroxyethyl cellulose, hydroxypropyl cellulose, methyl hydroxyethyl cellulose, methyl hydroxypropyl cellulose, hydroxyethyl hydroxypropyl cellulose, sulfoethyl cellulose, sulfoethyl carboxymethyl cellulose, methyl sulfoethyl cellulose, hydroxyethyl sulfoethyl cellulose, dihydroxypropyl cellulose, dihydroxypropyl hydroxyethyl cellulose, dihydroxypropyl carboxymethyl cellulose, carboxymethyl cellulose and esters and salts thereof, carboxymethyl hydroxyethyl cellulose, cellulose sulfate, polyfructosans, hemicelluloses, polyxylosans, polyarabosans, gellan, xanthan and pullulan,
X is chlorine or bromine, and
R is $C_1$-$C_7$-alkylene.

3. A process according to claim 1, wherein the polymer comprises at least one material selected from the group consisting of cellulose, methyl cellulose, hydroxyethyl cellulose, hydroxypropyl cellulose and starch,
X is chlorine, and
R is methylene or pentylene.

* * * * *